United States Patent
Browne et al.

(10) Patent No.: US 12,283,136 B2
(45) Date of Patent: Apr. 22, 2025

(54) DIGITAL TWIN GENERATION AND LOGGING FOR A VEHICLE

(71) Applicant: THE BOEING COMPANY, Chicago, IL (US)

(72) Inventors: Michael J. Browne, Untersiggenthal (CH); Andre Lutz, Erzhausen (DE); Hilna Sahle, Darmstadt (DE); Andreas Godehart, Dreieichenhain (DE); Mirza Maznikar, Shtip (MK)

(73) Assignee: The Boeing Company, Chicago, IL (US)

( * ) Notice: Subject to any disclaimer, the term of this patent is extended or adjusted under 35 U.S.C. 154(b) by 92 days.

(21) Appl. No.: 17/527,824

(22) Filed: Nov. 16, 2021

(65) Prior Publication Data

US 2023/0154240 A1   May 18, 2023

(51) Int. Cl.
| | |
|---|---|
| *G07C 5/00* | (2006.01) |
| *G06F 30/15* | (2020.01) |
| *G06K 9/00* | (2022.01) |
| *G06N 20/00* | (2019.01) |
| *G06V 20/59* | (2022.01) |
| *G07C 5/08* | (2006.01) |

(52) U.S. Cl.
CPC ............ *G07C 5/006* (2013.01); *G06F 30/15* (2020.01); *G06N 20/00* (2019.01); *G06V 20/59* (2022.01); *G07C 5/008* (2013.01); *G07C 5/085* (2013.01)

(58) Field of Classification Search
CPC ........ G07C 5/006; G07C 5/008; G07C 5/085; G06N 20/00; G06F 30/15; G06V 20/59
USPC .......................................................... 701/29.4
See application file for complete search history.

(56) References Cited

U.S. PATENT DOCUMENTS

| | | | |
|---|---|---|---|
| 8,443,301 B1 * | 5/2013 | Easterly ................. | G07C 5/006 |
| | | | 715/848 |
| 10,410,182 B1 * | 9/2019 | Tang ....................... | G06T 7/001 |
| 10,607,084 B1 * | 3/2020 | Tang ................... | G06F 16/7837 |
| 11,079,748 B1 * | 8/2021 | Garvey ............ | G05B 19/40936 |
| 11,132,479 B1 * | 9/2021 | Tyson, II ......... | G05B 19/41805 |
| 11,191,423 B1 * | 12/2021 | Zingaretti ............... | G06T 19/00 |
| 2012/0303336 A1 * | 11/2012 | Becker ...................... | B64F 5/00 |
| | | | 703/1 |

(Continued)

OTHER PUBLICATIONS

Sebastian Utzig et al., "Augmented Reality for Remote Collaboration in Aircraft Maintenance Tasks," 2019 IEEE Aerospace Conference, IEEE, Dated Mar. 2, 2019, pp. 1-10.

(Continued)

*Primary Examiner* — Kurt Philip Liethen
*Assistant Examiner* — John D Bailey
(74) *Attorney, Agent, or Firm* — Yee & Associates, P.C.

(57) ABSTRACT

The present disclosure generates a digital twin of the interior of a vehicle to initiate and track maintenance issues. In one aspect, the digital twin is formed using multiple captured images of the interior of the vehicle where multiple components in those images are identified using a machine learning (ML) model. The components identified by the ML model are then mapped to a model (e.g., a 3D model) of the components that lists their location in the vehicle and an identifier (e.g., a part number or serial number). In this manner, the digital twin can identify, using the identifiers, the various components in the images captured by a camera.

20 Claims, 5 Drawing Sheets

(56) References Cited

U.S. PATENT DOCUMENTS

| | | | | |
|---|---|---|---|---|
| 2016/0154926 | A1* | 6/2016 | Szigeti | G06T 7/80 |
| | | | | 703/8 |
| 2018/0143756 | A1* | 5/2018 | Mildrew | G06T 17/05 |
| 2018/0144535 | A1* | 5/2018 | Ford | G06T 15/005 |
| 2019/0077524 | A1* | 3/2019 | Faber | B64G 1/242 |
| 2019/0095877 | A1* | 3/2019 | Li | G06V 20/63 |
| 2019/0392256 | A1* | 12/2019 | Cho | G06V 10/764 |
| 2020/0268260 | A1* | 8/2020 | Tran | A61B 5/1117 |
| 2020/0334643 | A1* | 10/2020 | Tang | G07C 5/085 |
| 2021/0174612 | A1* | 6/2021 | Wilmering | G06F 30/27 |
| 2021/0201526 | A1* | 7/2021 | Moloney | G06N 3/082 |
| 2021/0272394 | A1* | 9/2021 | Cella | G05B 13/027 |
| 2021/0279852 | A1* | 9/2021 | Jakka | G06F 3/0484 |
| 2021/0334565 | A1* | 10/2021 | Roche | B60K 35/29 |
| 2021/0356950 | A1* | 11/2021 | Garvey | G05B 19/401 |
| 2023/0116059 | A1* | 4/2023 | Iseli | G05B 19/41885 |
| | | | | 700/170 |

OTHER PUBLICATIONS

European Patent Office, Extended European Search Report for Application 22207168.0-1218 dated Apr. 4, 2023.

* cited by examiner

DIGITAL TWIN GENERATION AND LOGGING FOR A VEHICLE

FIELD

Aspects of the present disclosure relate to generating a digital twin of the interior of a vehicle. More particularly, aspects relate to using the digital twin to initiate and track maintenance actions.

BACKGROUND

Maintenance performed in the cabin of aircraft is often tracked using a physical log book. After identifying a maintenance issue, a flight attendant (or other airline employee) adds an entry in the log book that indicates the component needing maintenance, the issue with the component, and its location in the aircraft. However, the accuracy of the entry is dependent on the knowledge of the employees, who might describe maintenance issues in different ways or wordings. The employee might not provide an accurate description of the maintenance issue, or believe the problem is with a first component (e.g., an armrest) but the problem is actually with a different component (e.g., the backrest). After reading the entry in the log book, the maintenance personal may first have to evaluate the maintenance issue first hand to diagnosis the problem before retrieving or ordering a replacement part. This insecurity can greatly increase maintenance times. Further, relying on a physical log book to track maintenance problems does not provide efficient ways of evaluating the entries, such as learning which components malfunction the most.

SUMMARY

The present disclosure provides a method that in in one aspect includes receiving a model of an interior of a vehicle where the model defines locations of components in the interior of the vehicle and component identifiers, capturing images of the interior of a vehicle using one or more cameras, identifying components in the images using a machine learning (ML) model and mapping the components identified by the ML model to the components in the model to generate a digital twin of the vehicle where the digital twin correlates the components identified by the ML model to the component identifiers from the model.

In one aspect, in combination with any example method above or below, mapping the components identified by the ML model to the components in the model includes identifying locations associated with the images, correlating the locations associated with the images to the locations of the components in the model, and assigning the component identifiers in the model to the components identified by the ML model based on correlating the locations associated with the images to the locations of the components in the model.

In one aspect, in combination with any example method above or below, the model is a 3D model of the interior of the vehicle.

In one aspect, in combination with any example method above or below, the model is a 3D computer-aided design (CAD) of the interior of the vehicle.

In one aspect, in combination with any example method above or below, the method includes receiving the component identifiers of the components in the interior of the vehicle, receiving locations of the components in the interior of the vehicle, and generating the 3D CAD based on the component identifiers and the locations of the components.

In one aspect, in combination with any example method above or below, the method includes, after generating the digital twin, receiving an image of the interior of the vehicle comprising a first component needing maintenance, identifying a plurality of components in the image using a first ML model, mapping the plurality of components to a subset of components in the digital twin based on a location associated with the image, receiving a selection of one of the subset of components as the first component needing maintenance, and dispatching maintenance to fix the first component needing maintenance using a component identifier for the first component that is derived from the digital twin.

In one aspect, in combination with any example method above or below, the method includes, after dispatching maintenance, updating the digital twin to include at least one of (i) a record indicating the first component was repaired or (ii) an updated component identifier if the first component was replaced with a different component.

In one aspect, in combination with any example method above or below, the method includes, after mapping the plurality of components to a subset of components in the digital twin, transmitting for display, on a user device, a plurality of labels for the subset of components, wherein the user device captured the image and provides an augmented reality (AR) experience that permits a user to select from one of the subset of components as the first component needing maintenance.

The present disclosure provides a system in one aspect, the system includes a processor and a memory including instructions that when executed by the processor enable the system to perform an operation. The operation includes receiving a model of an interior of a vehicle, the model defining locations of components in the interior of the vehicle and component identifiers, capturing images of the interior of a vehicle using one or more cameras, identifying components in the images using a machine learning (ML) model, and mapping the components identified by the ML model to the components in the model to generate a digital twin of the vehicle, wherein the digital twin correlates the components identified by the ML model to the component identifiers from the model.

In one aspect, in combination with any example system above or below, mapping the components identified by the ML model to the components in the model includes identifying locations associated with the images, correlating the locations associated with the images to the locations of the components in the model, and assigning the component identifiers in the model to the components identified by the ML model based on correlating the locations associated with the images to the locations of the components in the model.

In one aspect, in combination with any example system above or below, the model is a 3D computer-aided design (CAD) of the interior of the vehicle.

In one aspect, in combination with any example system above or below, the operation includes receiving the component identifiers of the components in the interior of the vehicle, receiving locations of the components in the interior of the vehicle, and generating the 3D CAD based on the component identifiers and the locations of the components.

In one aspect, in combination with any example system above or below, the operation includes, after generating the digital twin, receiving an image of the interior of the vehicle comprising a first component needing maintenance, identifying a plurality of components in the image using a first ML model, mapping the plurality of components to a subset of components in the digital twin based on a location associated with the image, receiving a selection of one of the subset of components as the first component needing maintenance, and dispatching maintenance to fix the first component needing maintenance using a component identifier for the first component that is derived from the digital twin.

In one aspect, in combination with any example system above or below, the operation includes, after dispatching maintenance, updating the digital twin to include at least one of (i) a record indicating the first component was repaired or (ii) an updated component identifier if the first component was replaced with a different component.

In one aspect, in combination with any example system above or below, the operation includes, after mapping the plurality of components to a subset of components in the digital twin, transmitting for display, on a user device, a plurality of labels for the subset of components, wherein the user device captured the image and provides an augmented reality (AR) experience that permits a user to select from one of the subset of components as the first component needing maintenance.

The present disclosure provides a method in one aspect, the method includes receiving a digital twin of an interior of a vehicle, the digital twin comprising (i) components in the interior of the vehicle identified from images captured of the interior of the vehicle and (ii) component identifiers and locations of the components in the interior of the vehicle, receiving, after receiving the digital twin, an image of the interior of the vehicle comprising a first component needing maintenance, identifying a plurality of components in the image using a ML model, mapping the plurality of components identified by the ML model to a subset of components in the digital twin based on a location associated with the image, receiving a selection of one of the subset of components as the first component needing maintenance, dispatching maintenance to fix the first component needing maintenance using a component identifier for the first component that is derived from the digital twin.

In one aspect, in combination with any example method above or below, the method includes, after dispatching maintenance, updating the digital twin to include at least one of (i) a record indicating the first component was fixed or (ii) an updated component identifier when the first component was replaced with a different component.

In one aspect, in combination with any example method above or below, the method includes, after mapping the plurality of components to a subset of components in the digital twin, transmitting for display, on a user device, a plurality of labels for the subset of components, wherein the user device captured the image and provides an augmented reality (AR) experience that permits a user to select from one of the subset of components as the first component needing maintenance.

In one aspect, in combination with any example method above or below, the method includes receiving the location associated with the image from the user device, wherein the user device is configured to use the AR experience to identify the location associated with the image.

In one aspect, in combination with any example method above or below, the method includes, after receiving the selection of one of the subset of components as the first component needing maintenance, transmitting for display, on the user device and using the AR experience, a decision tree for identifying a problem with the first component needing maintenance.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure generates a digital twin of the interior of a vehicle to initiate and track maintenance issues. In one aspect, the digital twin is formed using multiple captured images of the interior of the vehicle where multiple components in those images are identified using one or more machine learning (ML) models. The components identified by the ML model are then mapped to a model (e.g., a 3D CAD model) of the components that lists their location in the vehicle and an identifier (e.g., a part number or serial number). In this manner, the digital twin can identify the various components in the images captured by a camera and correlate these components with the identifiers from the model.

When a maintenance issue is identified in the vehicle, a person can use a user device to capture an image or a video of the component needing maintenance. Using a ML model (which can be the same ML model used to generate the digital twin), the user device can identify the components in the image. By knowing the location of the identified components in the image, the user device can match the identified components with the components in the digital twin. When the person selects one of the identified components as the component needing maintenance, the digital twin can provide the identifier for that component (e.g., the part number). Knowing this, the maintenance personnel can bring the replacement parts that may be needed before coming to the vehicle. Further, the user device can display a decision tree to narrow down the problem (e.g., the USB port in the armrest is clogged, or the button on the armrest that controls the recline of the seat does not work). This information can also be reported to the maintenance personnel. Further, as parts are replaced in the aircraft, the digital twin can be updated so it continues to track the physical parts in the aircraft.

While the aspects below discuss generating and using a digital twin for an aircraft, these aspects can equally be applied to generate a digital twin for any type of vehicle such as a car, truck, ship, submarine, tank, etc.

Figure 1:
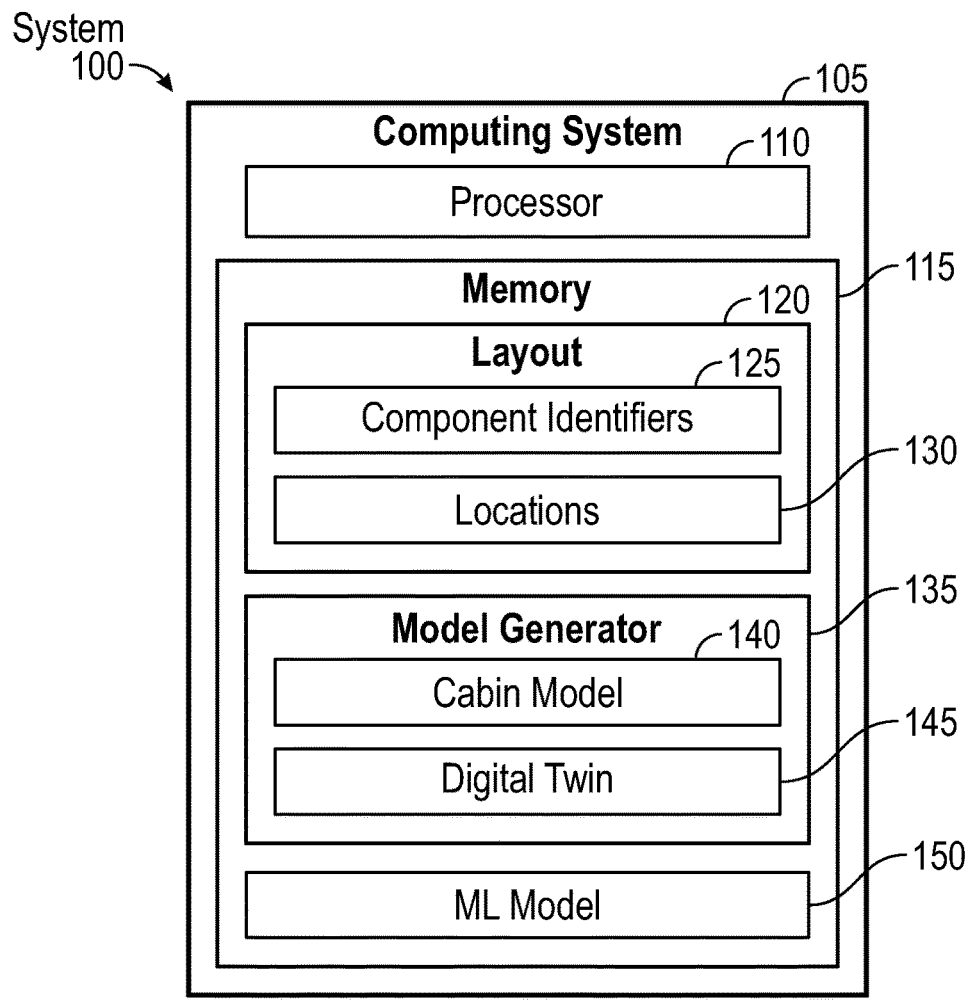
FIG. 1 illustrates a system for generating a digital twin of a cabin of an aircraft, according to aspects of the present disclosure.
Figure 1:
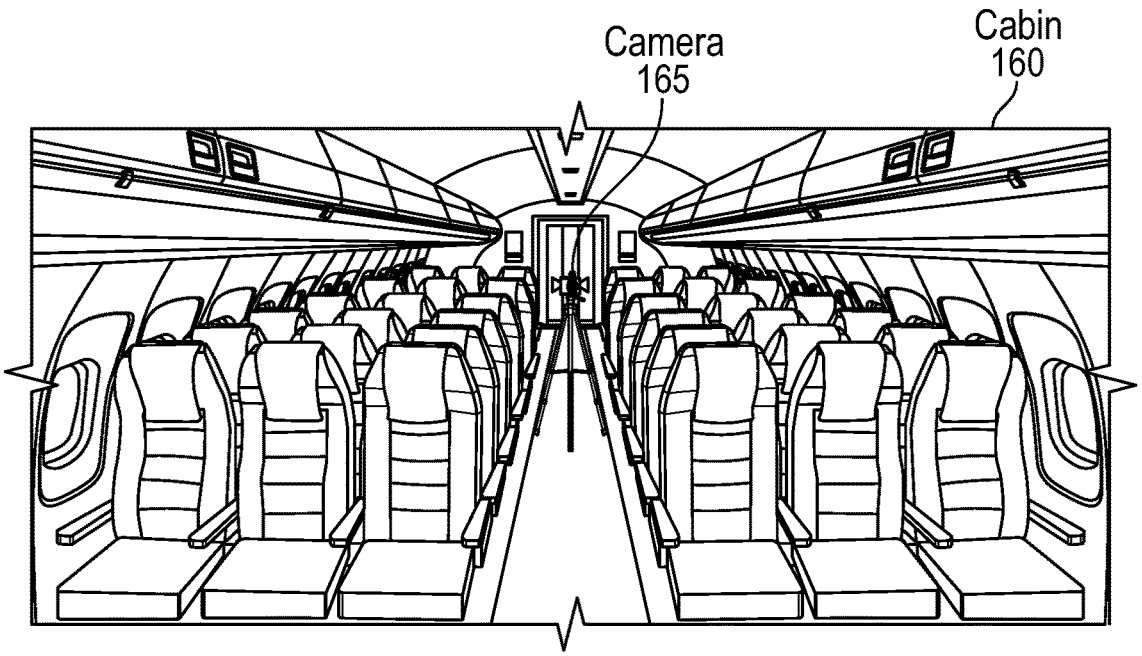

FIG. 1 illustrates a system 100 for generating a digital twin 145 of a cabin 160 of an aircraft, according to aspects of the present disclosure. The system 100 includes a computing system 105 for generating the digital twin 145 that includes a processor 110 and memory 115. The processor 110 represents any number of processing elements (e.g., central processing units) that each can include any number of processing cores.

The memory 115 can include volatile memory, nonvolatile memory, and combinations thereof. As shown, the memory 115 includes a layout 120 of the cabin 160, a model generator 135 for generating a 2D or 3D model of the cabin 160, and a ML model 150 for identifying the various components or parts in the cabin 160.

The layout 120 includes component identifiers 125 and locations 130 of the components in the cabin 160. In one aspect, the layout 120 is generated by the manufacturer of the aircraft, or a third-party that retrofits the interior of the cabin. For example, an airline operator may order from the manufacturer multiple aircraft that all have the same layout 120 of the cabin 160, or the layout 120 may be customized for a particular aircraft. The component identifiers 125 can be serial numbers, part numbers, or both that identify the components in the cabin 160. For example, each seat in the cabin 160 may be the same and have the same serial number. Additionally or alternatively, the seats may have part numbers that uniquely identify the seat. The serial or part numbers can be stored as the component identifiers 125 in the layout 120.

The locations 130 can be the 2D or 3D locations of the components in the cabin 160. The locations 130 identify where each component is located in the cabin. In one aspect, the locations 130 and the component identifiers 125 are mapped in a one-to-one relationship, thereby identifying each component in the cabin 160 as well as its location.

The model generator 135 (e.g., a software application) can generate a cabin model 140 of the cabin 160 using the layout 120. For example, the model generator 135 can output a 3D cabin model 140 (e.g., a computer aided design (CAD)) of the cabin 160. The model generator 135 can use the locations 130 and the component identifiers 125 to identify all the components in the cabin 160 and their relative locations in order to generate the cabin model 140. The model generator 135 can generate the cabin model 140 before the physical cabin 160 has been assembled. That is, in order to generate the cabin model 140, the model generator 135 only needs the design of the cabin 160 provided by the layout 120.

Using the cabin model 140 and captured images of the cabin 160, the model generator 135 generates the digital twin 145. That is, after the cabin 160 has been assembled or finished, a camera 165 (or multiple cameras) can be used to capture images of the components in the cabin 160. For example, the camera 165 may be a 3D camera that is moved through the cabin 160 in order to capture images (e.g., a video) of the interior of the aircraft.

In one aspect, the computing system 105 uses the ML model 150 to identify or classify the components in the images captured by the camera 165. For example, the ML model 150 may be trained to recognize all the components in the cabin 160 such as seats, armrests, overhead bins, galley equipment, lavatory equipment, light fixtures, window covers, call buttons, infotainment systems, and the like. The ML model 150 may be part of a computer vision system that evaluates the captured images and identifies the components in the images. In one aspect, the ML model 150 is trained to recognize a set number of items, i.e., items in the cabin 160. In some examples, the ML model 150 represents a convolution neural network, deep neural network, k-means clustering, support vector machine, or any other type of ML algorithm suitable for computer vision.

Once the ML model 150 identifies the components in the images, the model generator 135 maps these components to the components in the cabin model 140. In one aspect, the real-world components identified from the images are mapped one-to-one to the components in the cabin model 140. This mapping can be performed by matching the locations of the components in the images to the locations of the components in the cabin model 140. For example, the camera 165 may capture an image of the seats and overhead bin at row 10 in the cabin 160. The model generator 135 can then assign those seats and overhead bin the component identifiers 125 of the seats and overhead bin at the same row in the cabin model 140. In this manner, the digital twin links or maps real-world components to their component identifiers 125 in the cabin model 140. As described in more detail below, the digital twin 145 can then be used to perform maintenance operations and track the current components in the cabin 160 as different components are replaced.

Figure 2:
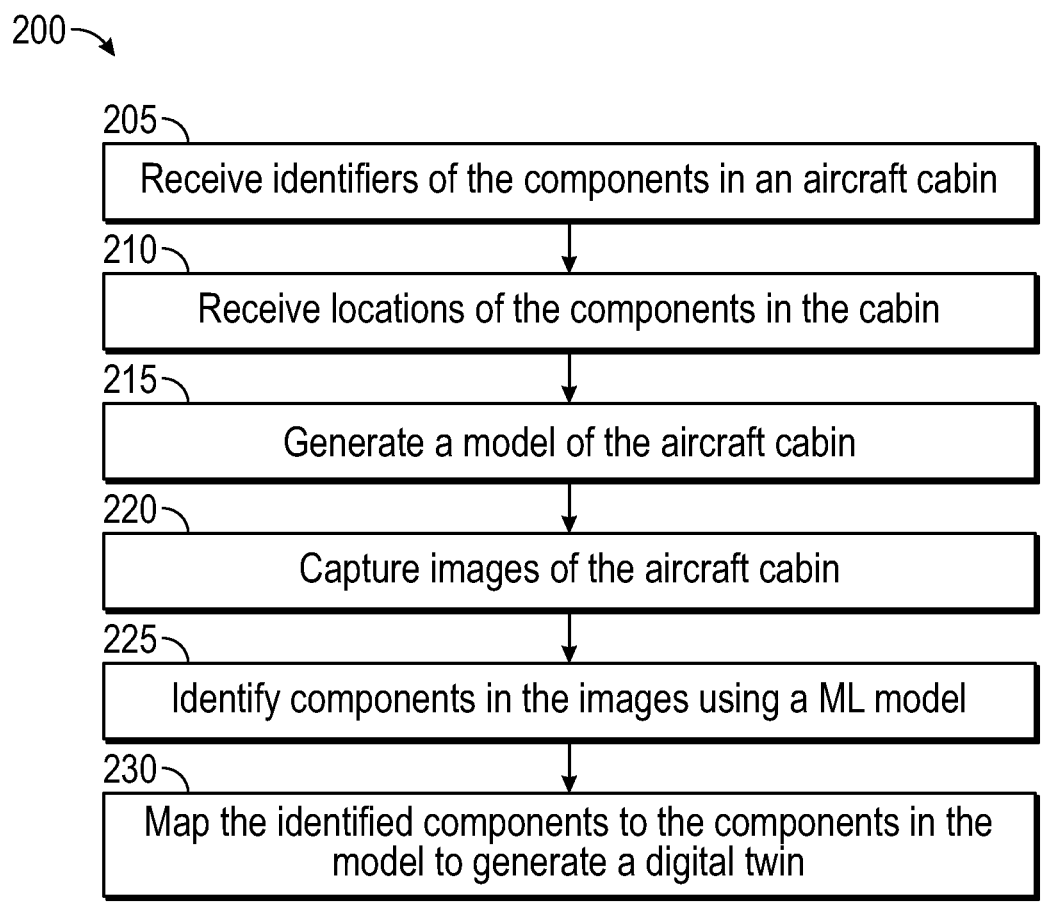
FIG. 2 is a flowchart for generating a digital twin of a cabin of an aircraft, according to aspects of the present disclosure.

FIG. 2 is a flowchart of a method 200 for generating a digital twin of a cabin of an aircraft, according to aspects of the present disclosure. At block 205, the model generator (e.g., the model generator 135 in FIG. 1) receives identifiers of the components in an aircraft cabin. These component identifiers can be part numbers, serial numbers, and the like. The component identifiers can be used to distinguish between different seats (e.g., seats made by different manufacturers, or different types of seats such as standard or premium). In one aspect, the component identifiers uniquely identify the seats from other seats of the same type, but this is not a requirement. For example, all the same type of seats in the cabin (e.g., all the standard seats) may have the same component identifier, rather than unique part numbers. In any case, the components are uniquely identified by a part number or a by location within the model or cabin.

In one aspect, the component identifiers are provided by the manufacturer, or whatever party that designs the cabin of the aircraft. The component identifiers can be part of a layout (e.g., the layout 120 in FIG. 1) that lists all the components in the cabin such as seats, armrests, overhead bins, galley equipment, lavatory equipment, light fixtures, window covers, call buttons, infotainment systems, and the like. The layout may be any data structure that lists these components such as a spreadsheet, database, and the like.

At block 210, the model generator receives the locations of the components in the cabin. In one aspect, the locations correspond to a point or volume where the component may be located in the cabin. For example, each component may have a corresponding location that defines where it is located in 3D space in the cabin. However, it may not be necessary for the location to be a 3D location. In some aspects, the location may be a 2D location of the component that can be used to generate a 2D model of the cabin (e.g., a top-down view of the cabin). Further, the locations may be provided in the same layout which includes the component identifiers.

At block 215, the model generator generates a model of the aircraft cabin. In one aspect, this model (e.g., the cabin model 140 in FIG. 1) is a 3D model of the components and structures in the cabin. In one aspect, the 3D model is a CAD model.

Figure 3:
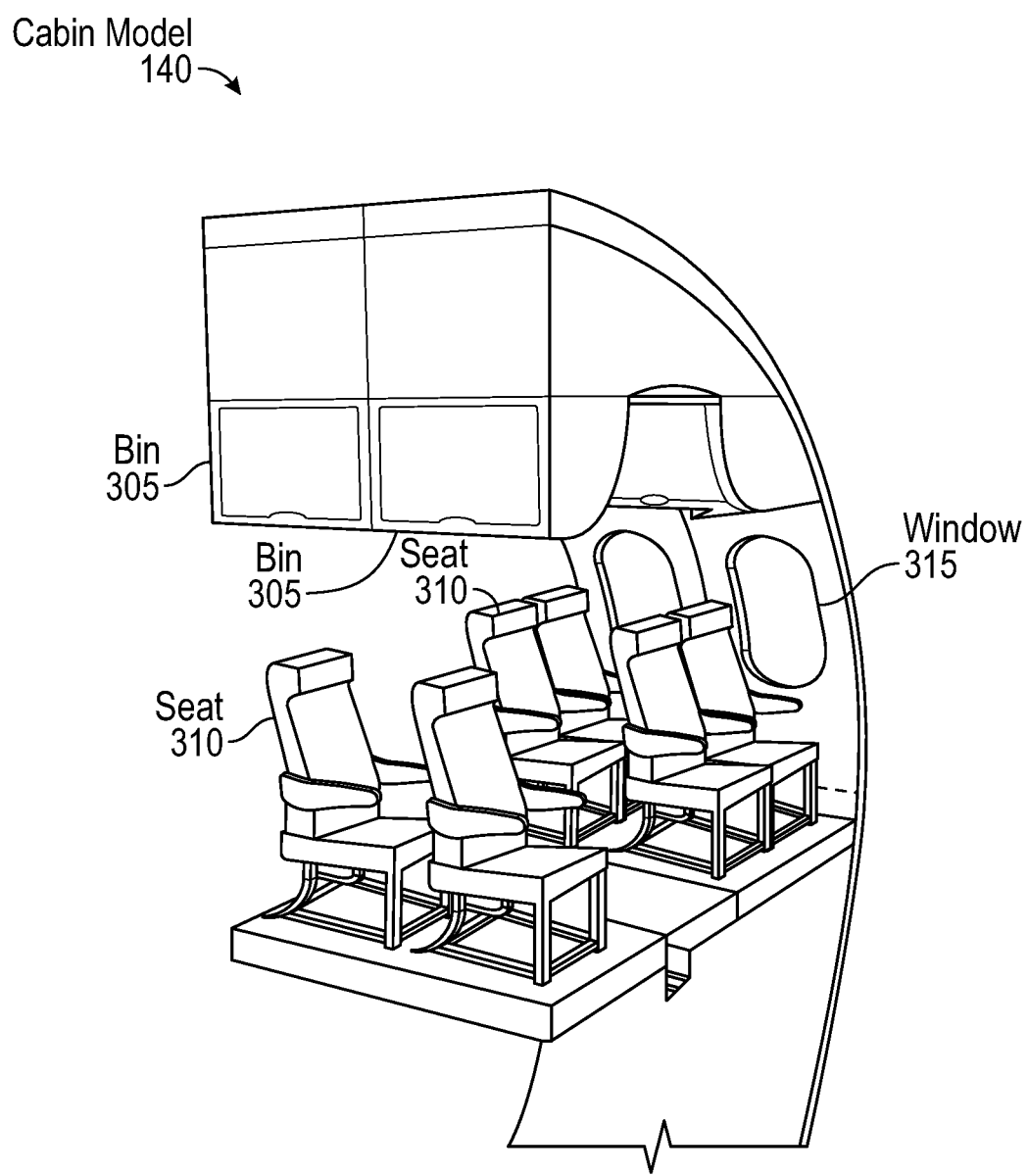
FIG. 3 illustrates a 3D model of a portion of a cabin of an aircraft, according to aspects of the present disclosure.

FIG. 3 illustrates a 3D model of a portion of a cabin of an aircraft, according to aspects of the present disclosure. In this example, the cabin model 140 includes overhead bins 305, seats 310, windows 315, as well as other unlabeled components or structures forming the design of the cabin of the aircraft. In one aspect, the model generator generates the cabin model 140 using the component identifiers and locations received at blocks 205 and 210 of the method 200. Thus, the cabin model 140 is a simulation or design of the cabin, rather than a picture or image of the actual, physical cabin.

In one aspect, the cabin model 140 may be prepared by a third party and is received by the aircraft manufacturer. In that case, the blocks 205 and 210 may be omitted from the method 200.

At block 220, a camera or cameras capture images of the aircraft cabin. That is, after the cabin has been completed (or retrofitted), cameras may be disposed or carried through the cabin, capturing images of the various components in the cabin. For example, a 3D camera can be mounted at different locations in the cabin (e.g., at every row, in galleys, in lavatories, etc.) to capture images of the components at those locations.

At block 225, a ML model (e.g., the ML model 150 in FIG. 1) identifies components in the images. The ML model may be part of a computer vision system that can identify and label components in the images. In one aspect, the ML model is trained to recognize the components in the cabin. Thus, a ML model used to identify components in a cabin of an aircraft may be different than a ML model used to identify components in the cabin of a car, or the interior or a ship. In any case, the ML model is not limited to any particular type of ML algorithm but can include any algorithm suitable to detect objects in an image or a video.

At block 230, the model generator maps the identified components to the components in the cabin model to generate a digital twin. That is, the model generator correlates or matches the components from the images (which were identified by the ML model at block 220) to the corresponding components in the cabin model generated at block 215. In one aspect, the model generator can correlate the components using their respective locations. For example, the model generator may know the location of the camera that captured the images, and thus, identify the location of the components in the images (e.g., a row number, 3D coordinate, or bounding volume). The model generator can then search the cabin model to identify the same component at that location. For example, if the ML model identified an overhead bin at row 10 in the captured image, the model generator can match that overhead bin to the overhead bin at row 10 in the cabin model. In this manner, the label identified by the ML model, along with the location of the component, can be used to map or correlate the component to the corresponding component in the cabin model. Doing so permits the model generator to assign the same component identifier to the component in the digital twin. For example, assuming each seat in the cabin model has a different serial number, after mapping the seats shown in the images to their corresponding seats in the cabin model, the model generator can assign the component identifiers stored in the cabin model to the seats captured by the images in the digital twin.

In one aspect, the digital twin includes the images captured of the cabin where the various real-world components in those images are assigned the component identifiers. As such, the digital twin maps real-world components in the cabin to their component identifiers which facilitates improved maintenance operations and tracking of the components in the cabin as discussed in more detail below. In one aspect, the images in the digital twin are stitched together to form a view of the cabin of the aircraft similar to the model 140 in FIG. 3 except showing the real-world components rather than CAD models of the components.

Figure 4:
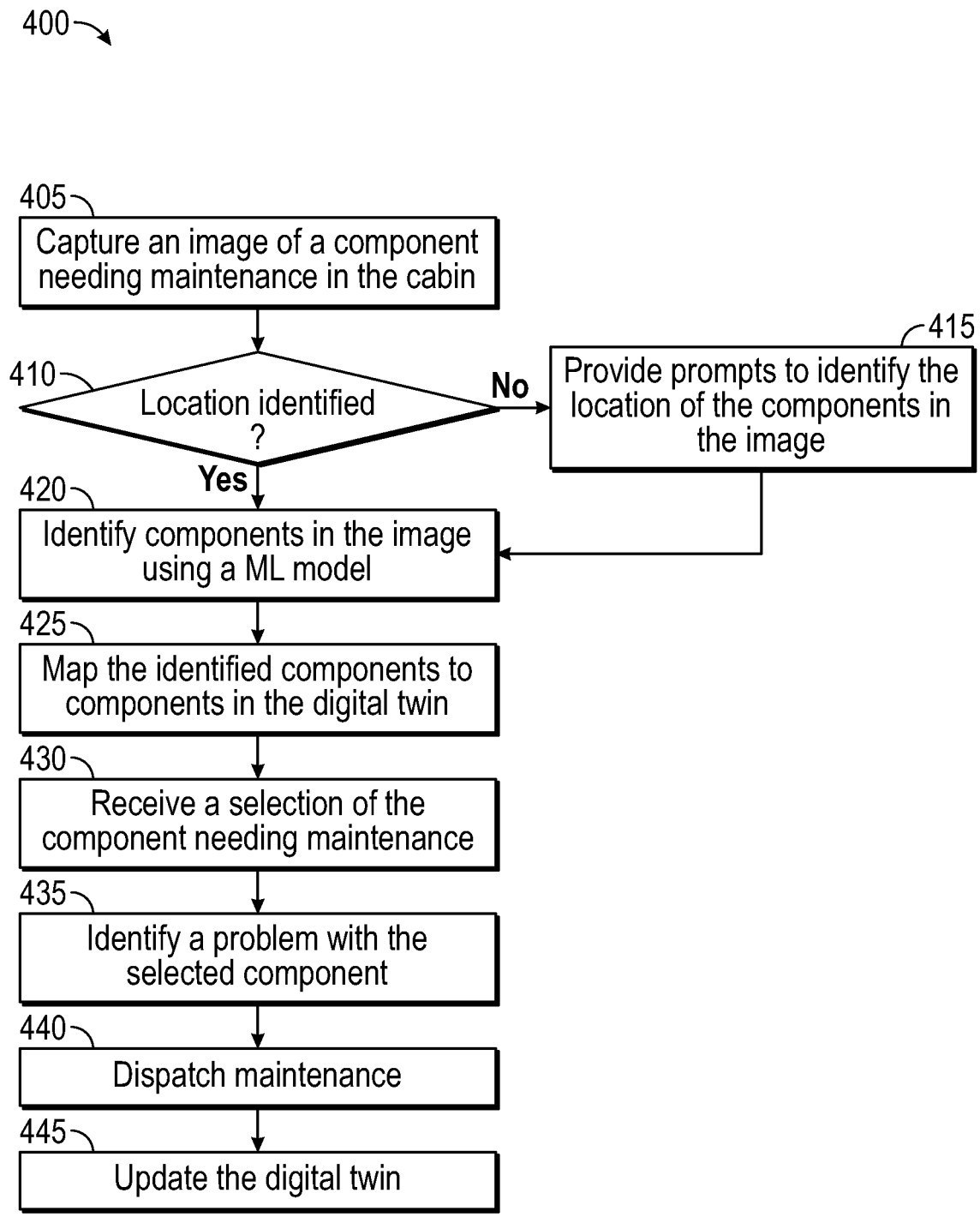
FIG. 4 is a flowchart for identifying a component needing maintenance using the digital twin, according to aspects of the present disclosure.

FIG. 4 is a flowchart of a method 400 for identifying a component needing maintenance using the digital twin, according to aspects of the present disclosure. In one aspect, the method 400 occurs after the digital twin has been created using, e.g., the method 200 in FIG. 2. In one aspect, the method 400 can be used to perform maintenance on a component in the cabin that has broken or is otherwise faulty.

At block 405, an employee captures an image of a component needing maintenance in the cabin. The employee could be a stewardess, inspector, stocker, pilot, or anyone that has responsibility for maintaining the components in the cabin. In one aspect, a customer may capture of an image of a component needing maintenance using, for example, the airline's app in order to self-report a maintenance issue.

The image can be captured using a user device such as a smart phone or a tablet. The user device can include a network connection (e.g., cellular or Wi-Fi) that can upload the image to a maintenance handler (e.g., a software application that dispatches and tracks maintenance request for the aircraft).

At block 410, the maintenance handler determines whether the location of the component needing maintenance can be identified. In one aspect, the maintenance handler may identify the location by attempting to match the image to a portion of the digital twin. That is, since the digital twin is formed from images of the aircraft, the maintenance handler can use an image matching technique to determine whether it can match the captured image to a portion of the digital twin. For example, some portions of the digital twin may be uniquely identifiable such as a particular galley, or a row with an unusual seating configuration.

In another aspect, the user device reports its location in the cabin when it captured the image. For example, the user device can use triangulation or Wi-Fi location techniques to determine a particular location in the cabin at the time the image was captured. This location may be sufficient for the maintenance handler to identify the location of the components shown in the image (e.g., row 5, or the galley closest to the cockpit).

In another aspect, using an augmented reality (AR) experience, the user device may first ask the user to move to a predefined point or spot in the cabin which permits the user device to identify its location. For example, before capturing the image of the component needing maintenance, the user may point the camera of the user device at a particular location in the aircraft (the forward passenger door or cockpit door) so the user device can then identify its location in the aircraft. The user can then move or pivot the user device to point its camera at the component needing maintenance. As the user devices moves, it can continue to capture images of the cabin and track the location corresponding to the components in those images. In this manner, the user can first calibrate the user device so it can identify its current location before moving the user device until it points at the component needing maintenance. The user device can track the location of the components in the captured images as the user moves the device. For example, as the user moves the device backwards, the user device can count the rows. Thus, when the user turns the device to point at a particular row that has the component needing maintenance, the user device knows what row its camera is facing and can report this location to the maintenance handler.

If the maintenance handler cannot determine the location of the component (or was not told the location of the component), the method 400 proceeds to block 415 where the user device provides prompts to identify the location of the components in the image. For example, the user device may display a graphical user interface (GUI) or query box asking the user to input a row and seat number, or specify which galley or lavatory is depicted in the image. Alternatively, using an AR experience, the user device may ask the user to point its camera to a reference point or calibration point (e.g., a particular passenger door or the cockpit) and then again point the camera of the user device at the component needing maintenance. Doing so can permit the user device to calibrate its location within the aircraft and then provide the location of the component needing maintenance to the maintenance handler.

At block 420, the maintenance handler identifies the components in the image using a ML model. In one aspect, the ML model is the same ML model used to identify the components in the images used to generate the digital twin. These ML models may be trained to recognize components in the cabin of an aircraft. However, in another aspect, the ML model used in the method 400 may be different than the ML model used in the method 200 to generate the digital twin.

At block 425, the maintenance handler maps the identified components to components in the digital twin. That is, since the handler knows the locations of the identified components in the image, it can use those locations to map the identified components to corresponding subset of the components in the digital twin. For example, the maintenance handler may know, from the ML model, that the image includes three seats. The location corresponding to the image can inform the maintenance handler that these seats are seats A, B, and C of row 10. With this information, the maintenance handler can map these seats to the seats A, B, and C of row 10 in the digital twin.

At block 430, the maintenance handler receives a selection of the component needing maintenance. That is, the image captured by the user device can include several components (e.g., multiple seats, multiple armrests, a seat and an infotainment system, an overhead bin and call buttons, etc.) which were identified by the ML model. The maintenance handler may not know just by evaluating the image which component need maintenance (e.g., there is no obvious damage). Thus, the user device can display a GUI or query boxes asking the user to confirm which component in the image needs maintenance. This GUI or query boxes can label or highlight the components identified by the ML model and then ask the user to select one of the components. This is shown in FIG. 5.

Figure 5:
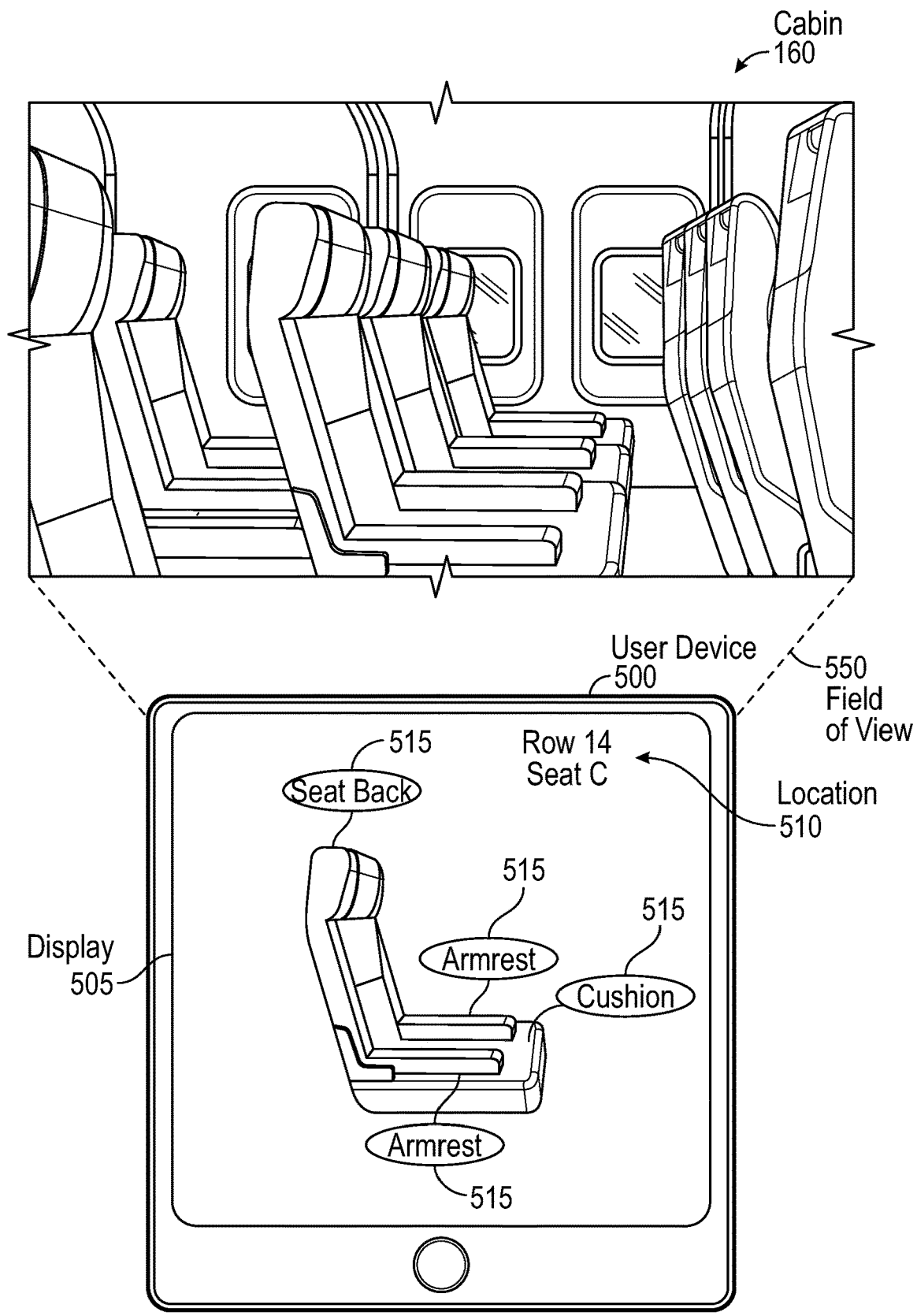
FIG. 5 illustrates a user device for interfacing with the digital twin to identify a component needing maintenance, according to aspects of the present disclosure.

FIG. 5 illustrates a user device 500 for interfacing with the digital twin to identify a component needing maintenance, according to aspects of the present disclosure. The user device 500 (e.g., a smart phone, tablet, laptop, etc.) includes a display 505 for displaying a field of view 550 captured by a camera (not shown) integrated into the user device 500. That is, the camera of the user device 500 captures a view of the cabin 160 which is then displayed on the display 505. For simplicity and ease of explanation, the image displayed by the user device 500 includes only one seat although in reality the displayed image could look exactly like the field of view 550 of the cabin 160 which has multiple seats, windows, and other structures.

As mentioned above, the ML model can receive the image captured by the camera and identify the various component in the image. In this example, the ML model has identified various components in a particular seat such as the seatback, armrests, and cushion. In response, the user device 500 outputs buttons 515 which include labels for the components identified by the ML model. The buttons 515 can be disposed over the components or have some other indicator (e.g., lead line) that match them with a particular component in the image. Further, the user device can output a textual or audio instruction to the user such as "PLEASE SELECT WHICH COMPONENT NEEDS MAINTENANCE." The user can then use an input object such as her finger, mouse, stylus, trackpad, or the like to select the button 515 corresponding to the component needing maintenance.

In this manner, the user device 500 can provide an AR experience to the user where, in real-time, the user device can display the buttons 515 to the user that correspond to the components identified by the ML model. For example, if the user moves the user device, the user device can send updated images to the ML model which can then identify any new components that have moved into the field of view 550. In real time, the user device 500 can present new buttons on the display 505 that correspond to the newly identified components while removing any buttons corresponding to components that are no longer displayed (i.e., components that are no longer in the field of view 550 of the camera). The AR experience can be updated as the user moves the user device 500. Moreover, as the ML model identifies new components, the maintenance handler can map these components to their counterparts in the digital twin as described above.

Returning to the method 400, at block 435 the maintenance handler identifies a problem with the selected component. In one aspect, the user device prompts the user to identify the problem. For example, after the user selects the component, the user device can output a decision tree to diagnosis the problem with the component. In one aspect, the user device (or the maintenance handler) stores a different decision tree for different components in the cabin. A decision tree for the armrest may display questions on the user device such as "CAN THE ARMREST BE RAISED?" or "DOES THE SEAT RECLINE BUTTON ON THE ARMREST WORK?". However, a decision tree for the cushion may display questions such as "IS THE CUSHION CUT?" or "DOES THE CUSHION NEED TO BE CLEANED?" The decisions trees can be based on common or known maintenance issues corresponding to the selected component. Providing decision trees to diagnosis the maintenance issue avoids the drawbacks with a paper log book where an employee who may not be a maintenance technician has to describe the problem with the component. As such, when a decision tree is used to diagnosis the problem, the maintenance technician dispatched to fix the issue may be more comfortable that the diagnosis is correct which means they can preemptively order any replacement parts or bring the necessary tools before they inspect the component themselves.

In another aspect, the user device permits the user to type in a description of the maintenance issue. This textual information may be the primary source of information for diagnosing the maintenance issue before the technician arrives, or could be used to supplement the information gained from a decision tree.

The user device can report the information it learns from the user to the maintenance handler. The handler can then process the information to identify the problem with the component.

At block 440, the maintenance handler dispatches maintenance to evaluate and fix the problem. In one aspect, the maintenance handler may open a ticket. The ticket may include the identity of the component, the location of the component, and the problem with the component. In one aspect, because the selected component is matched to a corresponding component in the digital twin, the ticket can include the component identifier for the component which is derived from the digital twin. With this information, the maintenance technician can preorder a replacement part without having to first inspect the component. In one aspect, the maintenance handler may automatically order a replacement part using the component identifier and the diagnosis of the problem. For example, the user may have provided a diagnosis that the maintenance handler knows almost always requires the component to be replaced. As such, when dispatching the ticket, the maintenance handler can instruct the replacement part to be brought to the aircraft, without waiting for the assigned maintenance technician to place the order.

At block 445, the maintenance handler updates the digital twin. This can be performed whether the technician was able to fix the component (without replacing it) or if the technician had to replace the component with a new component. The digital twin can store a recording to track how often the component was repaired. Eventually, if the component is repaired a threshold number of times (three times over a three year period), the maintenance handler can instruct the maintenance technician to replace the part, even if she believes the component can be repaired again. While this may cost more at the front end (for the replacement part), it may still reduce overall maintenance costs for the aircraft since it can reduce the number of times maintenance is dispatched to the aircraft. Or, if the maintenance technician is dispatched to fix a malfunctioning component, the maintenance handler can identify similar components that are likely to malfunction in the short term future and request that the technician replace those components as well—i.e., perform preemptive maintenance.

If the component is replaced, the maintenance handler can update the digital twin to store the component identifier of the new part (assuming it is different). For example, a faulty infotainment system may be replaced by a newer model with a different serial number, since the older model may have been discontinued. Updating the digital twin permits the maintenance handler to better track failure rates between the old and new models. Further, if the aircraft operator decides it wants to upgrade all the infotainment systems to the newer model, the digital twin already tracks which systems need to be replaced and which have already been replaced.

Using the aspects above, the digital twin can be used to mirror or track the physical components in the cabin of an aircraft (or other vehicle). This can reduce maintenance time and cost by providing the maintenance technician with accurate component identifiers so that replacement parts and special tools can be ordered or acquired before the technician enters the aircraft. Further, by updating the digital twin as maintenance tasks occur, the aircraft operator can identify defective components that wear out before their expected lifetime and identify preemptive maintenance tasks.

A further understanding of at least some of the aspects of the present disclosure is provided with reference to the following numbered Clauses, in which:

Clause 1: A method that includes receiving a model of an interior of a vehicle where the model defines locations of components in the interior of the vehicle and component identifiers, capturing images of the interior of a vehicle using one or more cameras, identifying components in the images using a machine learning (ML) model and mapping the components identified by the ML model to the components in the model to generate a digital twin of the vehicle where the digital twin correlates the components identified by the ML model to the component identifiers from the model.

Clause 2: A method as in any one of the clauses 1 and 3-8 where mapping the components identified by the ML model to the components in the model includes identifying locations associated with the images, correlating the locations associated with the images to the locations of the components in the model, and assigning the component identifiers in the model to the components identified by the ML model based on correlating the locations associated with the images to the locations of the components in the mode Clause 3: A method as in any one of the clauses 1-2 and 4-8 where the model is a 3D model of the interior of the vehicle.

Clause 4: A method as in any one of the clauses 1-3 and 5-8 where the model is a 3D computer-aided design (CAD) of the interior of the vehicle.

Clause 5: A method as in any one of the clauses 1-4 and 6-8 where the method includes receiving the component identifiers of the components in the interior of the vehicle, receiving locations of the components in the interior of the vehicle, and generating the 3D CAD based on the component identifiers and the locations of the components.

Clause 6: A method as in any one of the clauses 1-5 and 7-8 where the method includes, after generating the digital twin, receiving an image of the interior of the vehicle comprising a first component needing maintenance, identifying a plurality of components in the image using a first ML model, mapping the plurality of components to a subset of components in the digital twin based on a location associated with the image, receiving a selection of one of the subset of components as the first component needing maintenance, and dispatching maintenance to fix the first component needing maintenance using a component identifier for the first component that is derived from the digital twin.

Clause 7: A method as in clause 6 where, after dispatching maintenanceupdating the digital twin to include at least one of (i) a record indicating the first component was repaired or (ii) an updated component identifier if the first component was replaced with a different component.

Clause 8: A method as in clause 6 or 7, after mapping the plurality of components to a subset of components in the digital twin, transmitting for display, on a user device, a plurality of labels for the subset of components, wherein the user device captured the image and provides an augmented reality (AR) experience that permits a user to select from one of the subset of components as the first component needing maintenance.

Clause 9: A system, comprising: a processor and a memory including instructions that when executed by the processor enable the system to perform an operation. The operation includes receiving a model of an interior of a vehicle, the model defining locations of components in the interior of the vehicle and component identifiers, capturing images of the interior of a vehicle using one or more cameras, identifying components in the images using a machine learning (ML) model, and mapping the components identified by the ML model to the components in the model to generate a digital twin of the vehicle, wherein the digital twin correlates the components identified by the ML model to the component identifiers from the model.

Clause 10: A system as in any one of the clauses 9 and 11-15 wherein mapping the components identified by the ML model to the components in the model includes identifying locations associated with the images, correlating the locations associated with the images to the locations of the components in the model, and assigning the component identifiers in the model to the components identified by the ML model based on correlating the locations associated with the images to the locations of the components in the model.

Clause 11: A system as in any one of the clauses 9-10 and 12-15 where the model is a 3D computer-aided design (CAD) of the interior of the vehicle Clause 12: A system as in clause 9 where the operation includes receiving the component identifiers of the components in the interior of the vehicle, receiving locations of the components in the interior of the vehicle, and generating the 3D CAD based on the component identifiers and the locations of the components.

Clause 13: A system as in any one of the clauses 9-12 and 14-15 where the operation includes, after generating the digital twin, receiving an image of the interior of the vehicle comprising a first component needing maintenance, identifying a plurality of components in the image using a first ML model, mapping the plurality of components to a subset of components in the digital twin based on a location associated with the image, receiving a selection of one of the subset of components as the first component needing maintenance, and dispatching maintenance to fix the first component needing maintenance using a component identifier for the first component that is derived from the digital twin.

Clause 14: A system as in clause 13 or 15 where, after dispatching maintenance, updating the digital twin to include at least one of (i) a record indicating the first component was repaired or (ii) an updated component identifier if the first component was replaced with a different component.

Clause 15: A system as in clause 13 or 14 where the operation further comprises, after mapping the plurality of components to a subset of components in the digital twin, transmitting for display, on a user device, a plurality of labels for the subset of components, wherein the user device captured the image and provides an augmented reality (AR) experience that permits a user to select from one of the subset of components as the first component needing maintenance.

Clause 16: A method comprising: receiving a digital twin of an interior of a vehicle, the digital twin comprising (i) components in the interior of the vehicle identified from images captured of the interior of the vehicle and (ii) component identifiers and locations of the components in the interior of the vehicle, receiving, after receiving the digital twin, an image of the interior of the vehicle comprising a first component needing maintenance, identifying a plurality of components in the image using a ML model, mapping the plurality of components identified by the ML model to a subset of components in the digital twin based on a location associated with the image, receiving a selection of one of the subset of components as the first component needing maintenance, and dispatching maintenance to fix the first component needing maintenance using a component identifier for the first component that is derived from the digital twin Clause 17: A method as in any of the clauses 16 or 18-20, after dispatching maintenance, updating the digital twin to include at least one of (i) a record indicating the first component was fixed or (ii) an updated component identifier when the first component was replaced with a different component.

Clause 18: A method as in any of the clauses 16-17 or 19-20, after mapping the plurality of components to a subset of components in the digital twin, transmitting for display, on a user device, a plurality of labels for the subset of components, wherein the user device captured the image and provides an augmented reality (AR) experience that permits a user to select from one of the subset of components as the first component needing maintenance Clause 19: A method as in any of the clauses 18 or 20 further comprising receiving the location associated with the image from the user device, wherein the user device is configured to use the AR experience to identify the location associated with the image.

Clause 20: A method as in any of the clauses 18 or 19 further comprising, after receiving the selection of one of the subset of components as the first component needing maintenance, transmitting for display, on the user device and using the AR experience, a decision tree for identifying a problem with the first component needing maintenance.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium (s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   receiving a model of an interior of a vehicle, the model defining locations of components in the interior of the vehicle and component identifiers;
   capturing images of the interior of a vehicle using one or more cameras;
   identifying components in the images using a machine learning (ML) model;
   mapping the components identified by the ML model to the components in the model to generate a digital twin of the vehicle, wherein the digital twin correlates the components identified by the ML model to the component identifiers from the model;
   receiving, from a wirelessly-connected user device, an image of the interior of the vehicle depicting a first component needing maintenance;
   receiving, from the user device, information describing a location of the user device in the interior of the vehicle;
   mapping, based on the location of the user device, the first component needing maintenance to a component identifier derived from the digital twin;
   displaying, on the user device, a GUI asking the user device to confirm the first component needing maintenance depicted in the image; and
   dispatching maintenance to fix the first component needing maintenance using the component identifier.

2. The method of claim 1, wherein the model is a 3D model of the interior of the vehicle.

3. The method of claim 2, wherein the model is a 3D computer-aided design (CAD) of the interior of the vehicle.

4. The method of claim 3, further comprising:
   receiving the component identifiers of the components in the interior of the vehicle;
   receiving locations of the components in the interior of the vehicle; and
   generating the 3D CAD based on the component identifiers and the locations of the components.

5. The method of claim 1, further comprising, after generating the digital twin:
   identifying a plurality of components in the image using the ML model;
   mapping the plurality of components to a subset of component identifiers derived from the digital twin based on a location associated with the image; and
   receiving, at the user device, a selection of one of the subset of component identifiers as the first component needing maintenance.

6. The method of claim 5, further comprising, after dispatching maintenance:
   updating the digital twin to include at least one of (i) a record indicating the first component was repaired or (ii) an updated component identifier if the first component was replaced with a different component.

7. The method of claim 5, further comprising, after mapping the plurality of components to a subset of components in the digital twin:
   transmitting for display, on the user device, a plurality of labels for the subset of components, wherein the user device captured the image and provides an augmented reality (AR) experience that permits a user to select from one of the subset of component identifiers as the first component needing maintenance.

8. The method of claim 1, wherein mapping the components identified by the ML model to the components in the model comprises:
   identifying locations associated with the images;
   correlating the locations associated with the images to the locations of the components in the model; and
   assigning the component identifiers in the model to the components identified by the ML model based on correlating the locations associated with the images to the locations of the components in the model.

9. A system, comprising:
   a processor; and
   a memory including instructions that when executed by the processor enable the system to perform an operation, the operation comprising:

receiving a model of an interior of a vehicle, the model defining locations of components in the interior of the vehicle and component identifiers;

capturing images of the interior of a vehicle using one or more cameras;

identifying components in the images using a machine learning (ML) model;

mapping the components identified by the ML model to the components in the model to generate a digital twin of the vehicle, wherein the digital twin correlates the components identified by the ML model to the component identifiers from the model;

receiving, from a wirelessly-connected user device, an image of the interior of the vehicle depicting a first component needing maintenance;

receiving, from the user device, information describing a location of the user device in the interior of the vehicle;

mapping, based on the location of the user device, the first component needing maintenance to a component identifier derived from the digital twin;

displaying, on the user device, a GUI asking the user device to confirm the first component needing maintenance depicted in the image; and dispatching maintenance to fix the first component needing maintenance using the component identifier.

10. The system of claim 9, wherein the operation further comprises, after generating the digital twin:

identifying a plurality of components in the image using the ML model;

mapping the plurality of components to a subset of component identifiers derived from the digital twin based on a location associated with the image; and receiving, at the user device, a selection of one of the subset of component identifiers as the first component needing maintenance.

11. The system of claim 10, wherein the operation further comprises, after dispatching maintenance:

updating the digital twin to include at least one of (i) a record indicating the first component was repaired or (ii) an updated component identifier if the first component was replaced with a different component.

12. The system of claim 10, wherein the operation further comprises, after mapping the plurality of components to a subset of components in the digital twin:

transmitting for display, on the user device, a plurality of labels for the subset of components, wherein the user device captured the image and provides an augmented reality (AR) experience that permits a user to select from one of the subset of component identifiers as the first component needing maintenance.

13. The system of claim 9, wherein the model is a 3D computer-aided design (CAD) of the interior of the vehicle.

14. The system of claim 13, wherein the operation further comprises:

receiving the component identifiers of the components in the interior of the vehicle;

receiving locations of the components in the interior of the vehicle; and generating the 3D CAD based on the component identifiers and the locations of the components.

15. The system of claim 9, wherein mapping the components identified by the ML model to the components in the model comprises:

identifying locations associated with the images;

correlating the locations associated with the images to the locations of the components in the model; and assigning the component identifiers in the model to the components identified by the ML model based on correlating the locations associated with the images to the locations of the components in the model.

16. A method, comprising:

receiving a digital twin of an interior of a vehicle, the digital twin comprising (i) components in the interior of the vehicle identified from images captured of the interior of the vehicle and (ii) component identifiers and locations of the components in the interior of the vehicle;

receiving, from a wirelessly-connected user device and after receiving the digital twin, an image of the interior of the vehicle depicting a first component needing maintenance;

receiving, from the user device, information describing a location of the user device in the interior of the vehicle;

identifying a plurality of components in the image using a ML model;

mapping the plurality of components identified by the ML model to a subset of component identifiers derived from the digital twin based on a location associated with the image, wherein mapping the plurality of components comprises:

mapping, based on the location of the user device, the first component needing maintenance to a component identifier derived from the digital twin;

receiving, at the user device, a selection of one of the subset of component identifiers as the first component needing maintenance;

displaying, on the user device, a GUI asking the user device to confirm the selection as the first component needing maintenance; and dispatching maintenance to fix the first component needing maintenance using the component identifier.

17. The method of claim 16, further comprising, after mapping the plurality of components to a subset of components in the digital twin:

transmitting for display, on the user device, a plurality of labels for the subset of components, wherein the user device captured the image and provides an augmented reality (AR) experience that permits a user to select from one of the subset of component identifiers as the first component needing maintenance.

18. The method of claim 17, further comprising:

receiving the location associated with the image from the user device, wherein the user device is configured to use the AR experience to identify the location associated with the image.

19. The method of claim 17, further comprising, after receiving the selection of one of the subset of components as the first component needing maintenance:

transmitting for display, on the user device and using the AR experience, a decision tree for identifying a problem with the first component needing maintenance.

20. The method of claim 16, further comprising, after dispatching maintenance:

updating the digital twin to include at least one of (i) a record indicating the first component was fixed or (ii) an updated component identifier when the first component was replaced with a different component.

* * * * *